(12) United States Patent
Kitamura

(10) Patent No.: US 8,170,403 B2
(45) Date of Patent: May 1, 2012

(54) VIDEO DATA REPRODUCTION APPARATUS

(75) Inventor: Norio Kitamura, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1810 days.

(21) Appl. No.: 11/384,132

(22) Filed: Mar. 17, 2006

(65) Prior Publication Data

US 2006/0210240 A1    Sep. 21, 2006

(30) Foreign Application Priority Data

Mar. 17, 2005  (JP) .................................. 2005-076888

(51) Int. Cl.
*H04N 5/783*    (2006.01)
(52) U.S. Cl. ........ 386/344; 386/240; 386/241; 386/343; 725/43; 725/52
(58) Field of Classification Search ................ 386/1, 46, 386/95, 111–112, 125, 126, 239–241, 282, 386/343–349; 725/37–40, 43, 44, 52, 53, 725/55
See application file for complete search history.

(56) References Cited

U.S. PATENT DOCUMENTS

| 5,517,257 | A | * | 5/1996 | Dunn et al. .................... 348/734 |
| 6,694,090 | B1 | * | 2/2004 | Lewis et al. ..................... 386/94 |
| 2002/0001453 | A1 | | 1/2002 | Mizumura et al. |
| 2005/0235316 | A1 | * | 10/2005 | Ahmad-Taylor ................ 725/44 |
| 2006/0045481 | A1 | * | 3/2006 | Yahata et al. .................... 386/95 |

FOREIGN PATENT DOCUMENTS

| EP | 1045225 | 10/2000 |
| JP | 06-338176 | 12/1994 |
| JP | 10-112089 | 4/1998 |
| JP | 10-155138 | 6/1998 |
| JP | 10-269651 | 10/1998 |
| JP | 10-283764 | 10/1998 |
| JP | 2001-103407 | 4/2001 |
| JP | 2001-202670 | 7/2001 |
| JP | 2001-332006 | 11/2001 |
| JP | 2001-344884 | 12/2001 |
| JP | 2002-117660 | 4/2002 |
| JP | 2003-309778 | 10/2003 |
| JP | 2004-185697 | 7/2004 |
| JP | 2004-289856 | 10/2004 |

(Continued)

OTHER PUBLICATIONS

Patent Abstracts of Japan, Publication No. 06-338176, dated Dec. 6, 1994 (1 page).

(Continued)

*Primary Examiner* — Thai Tran
*Assistant Examiner* — Mishawn Dunn
(74) *Attorney, Agent, or Firm* — Osha • Liang LLP

(57) ABSTRACT

A video data reproduction apparatus includes a selecting portion that selects a notification image associated in advance with a prescribed instruction when there is input of the prescribed instruction from a user while video data is being output, a generating portion that generates data for display by superposing specific information regarding a reproduction state of the video data in association with the prescribed instruction on the selected notification image, and a combining portion that combines the data for display generated by the generating portion with the video data.

4 Claims, 13 Drawing Sheets

FOREIGN PATENT DOCUMENTS

JP    2004-348966    12/2004

OTHER PUBLICATIONS

Patent Abstracts of Japan, Publication No. 10-155138, dated Jun. 9, 1998 (1 page).
Patent Abstracts of Japan, Publication No. 10-269651, dated Oct. 9, 1998 (1 page).
Patent Abstracts of Japan, Publication No. 10-283764, dated Oct. 23, 1998 (1 page).
Patent Abstracts of Japan, Publication No. 2001-202670, dated Jul. 27, 2001 (1 page).
Patent Abstracts of Japan, Publication No. 2001-332006, dated Nov. 30, 2001 (1 page).
Patent Abstracts of Japan, Publication No. 2001-344884, dated Dec. 14, 2001 (1 page).
Patent Abstracts of Japan, Publication No. 2002-117660, dated Apr. 19, 2002 (1 page).
Patent Abstracts of Japan, Publication No. 2004-185697, dated Jul. 2, 2004 (1 page).
Patent Abstracts of Japan, Publication No. 2004-289856, dated Oct. 14, 2004 (1 page).
Patent Abstracts of Japan, Publication No. 2004-348966, dated Dec. 9, 2004 (1 page).
European Search Report for European Application No. 06004663.8-1232, dated Feb. 12, 2008 (6 pages).
Patent Abstracts of Japan, Publication No. 10112089, Publication Date Apr. 28, 1998 (1 page).
Japanese Office Action for Japanese patent application No. 076888/2005, mailed Aug. 18, 2009, and English translation thereof, 5 pages.
Patent Abstracts of Japan for Japanese application with publication No. 2003-309778, Date of Publication: Oct. 31, 2003, 1 page.
Patent Abstracts of Japan for Japanese Application with Publication No. 2001-103407, Publication Date: Apr. 13, 2001, 1 page.

* cited by examiner

FIG.3

| CHAPTER NUMBER | REPRODUCTION TIME |
|---|---|
| 1 | 00:15:15 |
| 2 | 00:45:30 |
| 3 | 01:50:55 |
| ⋮ | ⋮ |
| n | 02:22:40 |

FIG.4

| INSTRUCTION CONTENT | SPLASH MARK |
|---|---|
| RECORD | ○ |
| PLAY | ▷ |
| PAUSE | ∥ |
| CHAPTER SKIP | ▷▷∣ |
| CHAPTER BACK SKIP | ∣◁◁ |
| FAST-FORWARD (2×) | ▷▷ |
| REWIND (2×) | ◁◁ |
| FAST-FORWARD (16×) | ▷▷▷▷ |
| REWIND (16×) | ◁◁◁◁ |
| ⋮ | ⋮ |

M131

M132

VIDEO DATA REPRODUCTION APPARATUS

BACKGROUND OF THE INVENTION

1. Field of the Invention

The present invention relates to a video data reproduction apparatus, and more particularly to a video data reproduction apparatus capable of performing OSD (On Screen Display) of image data or the like.

2. Description of the Background Art

In a video data reproduction apparatus, generally, a user needs to depress a prescribed operation button or the like to cause specific information indicating a reproduction state of video data (e.g., chapter information or reproduction time information) to be displayed on a screen during reproduction of the video data.

For example, Japanese Patent Laying-Open No. 2001-332006 (hereinafter, "Document 1") discloses that a title number, a chapter number and the like of the title being reproduced are displayed when a video remote control button is depressed during reproduction.

Various techniques to allow specific information corresponding to an operation of the device to be presented without the need of such special manipulation by the user have been proposed.

For example, Japanese Patent Laying-Open No. 2004-348966 (hereinafter, "Document 2") discloses that a chapter number of the chapter being searched for is displayed on a fluorescent tube display portion on an operation key panel in a blinking manner during the chapter search to inform the user that the search is in progress. Japanese Patent Laying-Open No. 2002-117660 (hereinafter, "Document 3") discloses that the number of the truck or chapter to be reproduced is displayed on a display unit. Japanese Patent Laying-Open No. 10-155138 (hereinafter, "Document 4") discloses that a title number of the program being reproduced, and the number of the chapter/truck to be reproduced from now in the title of the relevant title number are displayed on a front panel of a reproduction apparatus.

Further, Japanese Patent Laying-Open No. 10-269651 (hereinafter, "Document 5") discloses that a character or a symbol showing the time of CM skip is generated and displayed. Japanese Patent Laying-Open No. 06-338176 (hereinafter, "Document 6") discloses that a relative searching time is displayed on an upper left or lower left area of the screen with respect to the display of the video image being fast-forwarded or the like.

Japanese Patent Laying-Open No. 2004-185697 (hereinafter, "Document 7") discloses that a title and its time are displayed on a chapter search screen, and a thumbnail of the first video image of each chapter and the corresponding time position are displayed. Further, Document 4 described above discloses that a total reproduction time or a remaining reproduction time of the title as the reproduction target is displayed on the front panel of the reproduction apparatus.

Japanese Patent Laying-Open No. 2004-289856 (hereinafter, "Document 8") discloses in FIG. 4 that a triangle mark indicating a position on the image where a chapter mark is placed is displayed on a time line representing a total time of moving images being reproduced. Further, Document 7 described above discloses that an arrow pointing left or an arrow pointing right is displayed in an emphasized manner when the chapter is located ahead of or behind the time currently displayed on the screen. Japanese Patent Laying-Open No. 2001-344884 (hereinafter, "Document 9") discloses display control means for causing the display device to display position information regarding the position on a recording medium being accessed by the recording and reproduction apparatus, and updating means for updating the display of the position information by the display device in accordance with manipulation of a user. Japanese Patent Laying-Open No. 2001-202670 (hereinafter, "Document 10") discloses that a forward mode state in which reproduction is carried out by allowing the tape to travel in a forward direction, a reverse mode state in which reproduction is carried out by allowing the tape to travel in a reverse direction, the traveling direction of the tape, and the traveling speed of the tape are displayed. The traveling speed of the tape is displayed by changing the period of blinking. Further, Japanese Patent Laying-Open No. 10-283764 (hereinafter, "Document 11") discloses that video information recorded on a tape is reproduced in the state where a graph representing the tape is displayed on a monitor, and a portion of the video information having been reproduced is displayed on the graph with a mark indicating that the relevant portion has already been reproduced.

In each of Documents 2-11 described above, troublesomeness in manipulation is overcome, since a special manipulation by a user is unnecessary. However, these techniques each require a special display region to display various kinds of information.

SUMMARY OF THE INVENTION

The present invention has been made to solve the above-described problems. An object of the present invention is to provide a video data reproduction apparatus capable of displaying specific information without provision of a special display region.

A video data reproduction apparatus according to an aspect of the present invention includes an input portion, a first storage unit, a second storage unit, a controller including a first and a second reading portions and a selecting portion, a generating portion, a combining portion, and an output portion. The input portion receives instructions from a user. The first storage unit stores video data and management information of the video data. The second storage unit stores a plurality of prescribed notification images in association with the instructions, respectively. The first reading portion reads the video data stored in the first storage unit in response to the instructions. The selecting portion selects one of the notification images associated with a prescribed one of the instructions from the second storage unit when the prescribed instruction is input via the input portion while the video data is being output. The second reading portion refers to the management information to obtain specific information regarding a reproduction state of the video data in association with the prescribed instruction. The generating portion generates data for display by superposing the specific information on the notification image having been selected. The combining portion combines the data for display generated by the generating portion with the video data read by the first reading portion. The output portion outputs the data for display combined with the video data.

Preferably, the selected notification image indicates chapter skip. The second reading portion reads a total number of chapters of the video data and a chapter number of the chapter to be reached by skipping from chapter information included in the management information. The generating portion generates the data for display by superposing the total number of chapters and the chapter number on the selected notification image.

Preferably, the selected notification image includes two triangle marks that are serially connected in a lateral direction, and the generating portion generates the data for display by superposing the chapter number and the total number of chapters on one and the other of the two triangle marks.

Alternatively, the selected notification image indicates chapter skip, and the second reading portion may read, based on a first reproduction time of the video data at the time when the prescribed instruction was input, a second reproduction time to be reached by the chapter skip from the management information. In this case, the controller further includes a calculating portion for calculating a skip time based on the first and second reproduction times, and the generating portion generates the data for display by superposing the skip time on the selected notification image.

Preferably, the selected notification image includes two triangle marks serially connected in a lateral direction. The skip time is a time represented using two continuous time units, and the generating portion generates the data for display by superposing a larger time unit and a smaller time unit of the skip time on a left-side triangle mark and a right-side triangle mark, respectively, of the two triangle marks.

Alternatively, the selected notification image indicates chapter skip, and the second reading portion may read from chapter information included in the management information a reproduction time of the video data to be reached by the chapter skip. In this case, the generating portion generates the data for display by superposing the reproduction time on the selected notification image.

Preferably, the selected notification image includes two triangle marks serially connected in a lateral direction, and the generating portion generates the data for display by superposing a larger time unit and a smaller time unit constituting the reproduction time on a left-side triangle mark and a right-side triangle mark, respectively, of the two triangle marks.

Alternatively, the selected notification image indicates trick reproduction, and the second reading portion may read from the management information a total reproduction time of the video data being reproduced. In this case, the generating portion generates the data for display by superposing position information of a current reproduction time with respect to the total reproduction time on the selected notification image.

Preferably, the generating portion generates the data for display such that the selected notification image is displayed in different display manners in different portions bounded by a position corresponding to the current reproduction time when a length in a lateral direction of the selected notification image corresponds to the total reproduction time.

A video data reproduction apparatus according to another aspect of the present invention includes an input portion, a first storage unit, a first reading portion, an output portion, a second storage unit, a selecting portion, a second reading portion, a generating portion, and a combining portion. The input portion receives instructions from a user. The first storage unit stores video data and management information of the video data. The first reading portion reads the video data stored in the first storage unit in response to the instructions. The output portion outputs the video data read by the first reading portion. The second storage unit stores a plurality of prescribed notification images in association with the instructions, respectively. When an instruction for chapter skip among the instructions is input via the input portion while the video data is being output by the output portion, the selecting portion selects a first notification image associated with the instruction from the second storage unit. The second reading portion reads a total number of chapters in the video data and a chapter number of the chapter to be reached by the chapter skip from chapter information included in the management information. The generating portion generates data for display by superposing the total number of chapters and the chapter number having been read by the second reading portion on the first notification image having been selected by the selecting portion. Specifically, the generating portion generates the data for display by superposing the chapter number and the total number of chapters on one and the other of two triangle marks serially connected in a lateral direction that constitute the first notification image. The combining portion combines the data for display generated by the generating portion with the video data read by the first reading portion. The output portion outputs the data for display combined with the video data according to the instruction.

A video data reproduction apparatus according to yet another aspect of the present invention includes an input portion, a first storage unit, a first reading portion, an output portion, a second storage unit, a selecting portion, a second reading portion, a calculating portion, a generating portion, and a combining portion. The input portion receives instructions from a user. The first storage unit stores video data and management information of the video data. The first reading portion reads the video data stored in the first storage unit in response to the instructions. The output portion outputs the video data read by the first reading portion. The second storage unit stores a plurality of prescribed notification images in association with the instructions, respectively. When an instruction for chapter skip among the instructions is input via the input portion while the video data is being output by the output portion, the selecting portion selects a first notification image associated with the instruction from the second storage unit. The second reading portion reads, based on a first reproduction time of the video data at the time when the instruction was input, a second reproduction time to be reached by the chapter skip from chapter information included in the management information. The calculating portion calculates a skip time based on the first and second reproduction times. The generating portion generates data for display by superposing the skip time calculated by the calculating portion on the first notification image selected by the selecting portion. Specifically, the generating portion generates the data for display by superposing a larger time unit and a smaller time unit of the skip time on one and the other of two triangle marks serially connected in a lateral direction that constitute the first notification image. The combining portion combines the data for display generated by the generating portion with the video data read by the first reading portion. The output portion outputs the data for display combined with the video data according to the instruction.

A video data reproduction apparatus according to yet another aspect of the present invention includes an input portion, a first storage unit, a first reading portion, an output portion, a second storage unit, a selecting portion, a second reading portion, a generating portion, and a combining portion. The input portion receives instructions from a user. The first storage unit stores video data and management information of the video data. The first reading portion reads the video data stored in the first storage unit in response to the instructions. The output portion outputs the video data read by the first reading portion. The second storage unit stores a plurality of prescribed notification images in association with the instructions, respectively. When an instruction for chapter skip among the instructions is input via the input portion while the video data is being output by the output portion, the selecting portion selects a first notification image associated with the instruction from the second storage unit. The second reading portion reads a reproduction time of the video data to be reached by the chapter skip from chapter information included in the management information. The generating portion generates data for display by superposing the reproduction time having been read by the second reading portion on the first notification image having been selected by the selecting portion. Specifically, the generating portion generates the data for display by superposing a larger time unit and a smaller time unit of the reproduction time on a left-side triangle and a right-side triangle, respectively, of two triangle marks serially connected in a lateral direction that constitute the first notification image. The combining portion combines the data for display generated by the generating portion with the video data read by the first reading portion. The output portion outputs the data for display combined with the video data according to the instruction.

A video data reproduction apparatus according to yet another aspect of the present invention includes an input portion, a first storage unit, a first reading portion, an output portion, a second storage unit, a selecting portion, a second reading portion, a generating portion, and a combining portion. The input portion receives instructions from a user. The first storage unit stores video data and management information of the video data. The first reading portion reads the video data stored in the first storage unit in response to the instructions. The output portion outputs the video data read by the first reading portion. The second storage unit stores a plurality of prescribed notification images in association with the instructions, respectively. When an instruction for trick reproduction among the instructions is input via the input portion while the video data is being output by the output portion, the selecting portion selects a second notification image associated with the instruction from the second storage unit. The second reading portion reads from the management information a total reproduction time of the video data being reproduced. The generating portion generates data for display by superposing position information of a current reproduction time with respect to the total reproduction time having been read by the second reading portion on the second notification image having been selected by the selecting portion. Specifically, the generating portion generates the data for display in such a manner that the second notification image is represented in different display manners in different portions bounded by a position corresponding to the current reproduction time when a length in a lateral direction of the second notification image represents the total reproduction time. The combining portion combines the data for display generated by the generating portion with the video data read by the first reading portion. The output portion outputs the data for display combined with the video data according to the instruction.

According to the present invention, specific information corresponding to a content (meaning) of an instruction can be superposed on a notification image displayed in accordance with input of the instruction. This allows a user to obtain the specific information only by seeing the notification image. The user does not need to make a special manipulation to obtain the specific information, so that troublesomeness is overcome. Further, the user is provided with useful information, since the specific information superposed on the notification image is the information corresponding to the instruction content.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows by way of example contents of chapter information in the title management data.

FIG. 4 shows an example of a table of correspondence between instruction contents and splash marks.

DESCRIPTION OF THE PREFERRED EMBODIMENTS

Figure 1:
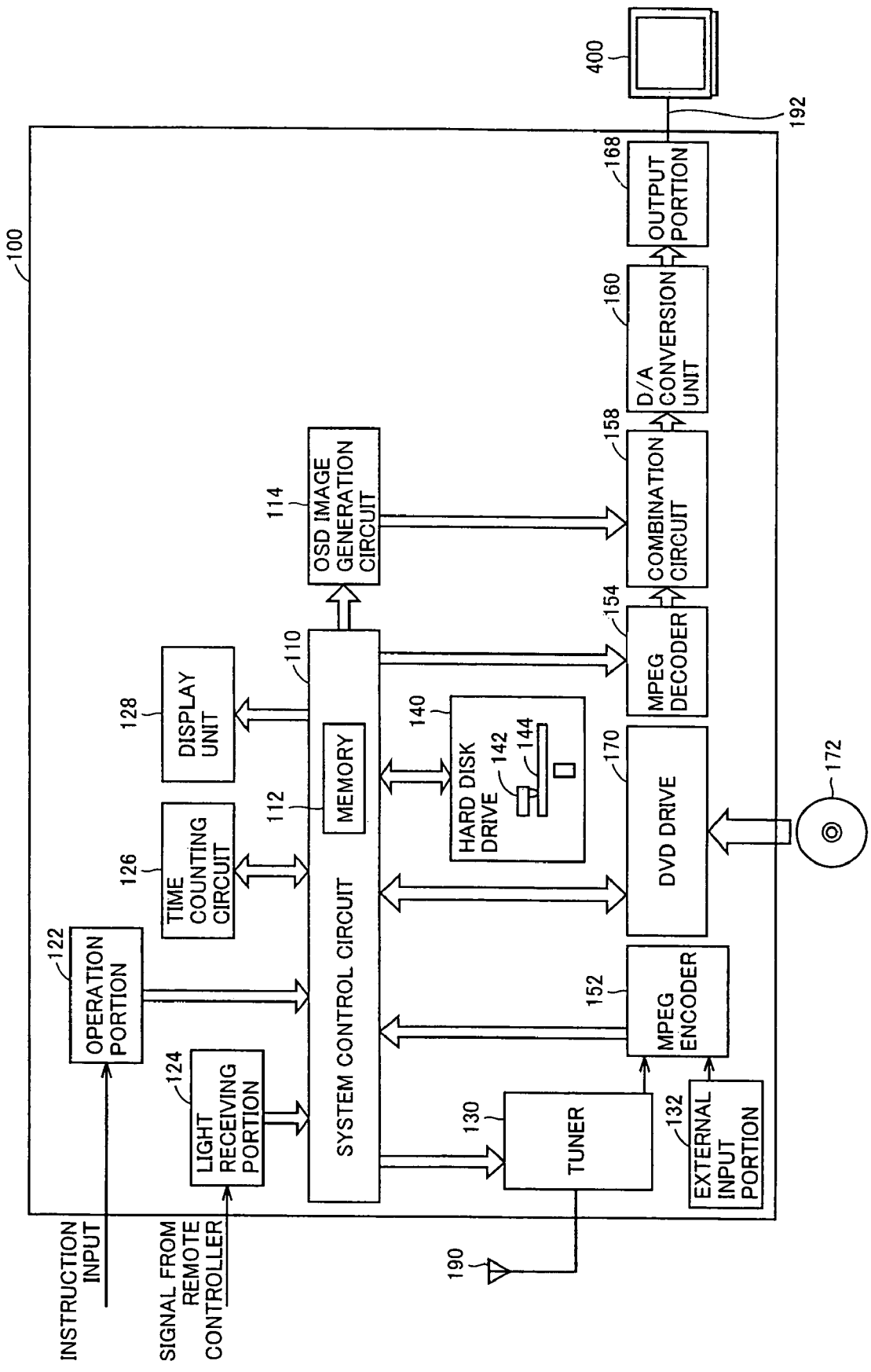
FIG. 1 is a block diagram showing a hardware configuration of a DVD recorder as one manner of a video data reproduction apparatus according to an embodiment of the present invention.

Hereinafter, embodiments of the present invention will be described in detail with reference to the drawings. In the drawings, the same or corresponding portions have the same reference characters allotted, and description thereof will not be repeated where appropriate.

First Embodiment

Referring to FIG. 1, a DVD recorder 100 will be described, which is one manner of the video data reproduction apparatus according to an embodiment of the present invention. FIG. 1 is a block diagram showing a hardware configuration of DVD recorder 100.

DVD recorder 100 includes a memory 112 for storing various data, a system control circuit 110 for performing processing predetermined based on stored data and an externally input instruction, an operation portion 122 for receiving an external input of an instruction from a user, a light receiving portion 124 for receiving a signal from a remote controller and outputting a predetermined control signal to system control circuit 110, a time counting circuit 126 for counting time and outputting a signal to system control circuit 110, and a display unit 128 for displaying information indicating an operation state of DVD recorder 100. Here, the operation state displayed on display unit 128 refers, for example, to time information in the DVD recorder, a reproduction state of a program, or the like.

Referring again to FIG. 1, DVD recorder 100 further includes an antenna 190, a tuner 130 for selecting a predetermined radio wave from received radio waves, an external input portion 132 for receiving an external input of video and audio signals, an MPEG (Moving Picture Experts Group) encoder 152 for compressing the input signals based on predetermined processing, a hard disk drive 140 for storing digital data based on an instruction from system control circuit 110, a DVD drive 170 for driving a DVD 172 so as to record or reproduce video and audio data, an MPEG decoder 154 for decoding the compressed video and audio signals, an OSD (On Screen Display) image generation circuit 114 for generating a signal for displaying the operation state or other information of DVD recorder 100 on a video display screen, a combination circuit 158 for combining a signal generated by OSD image generation circuit 114 with a signal output from MPEG decoder 154 and outputting the combined signal, a D/A (Digital to Analog) conversion unit 160 for converting an input digital signal to an analog signal and outputting the resultant signal, and an output portion 168 for outputting the video and audio signals, to which a transmission cable 192 can be connected. DVD recorder 100 is connected to a television set 400 via transmission cable 192. Hard disk drive 140 includes a data recording and reproduction head 142 for recording and reproducing data, and a hard disk 144 storing data.

In the following, explanation will be made using video data as the data recorded on DVD 172 or hard disk 144. The data however is not restricted to the video data; it may include audio data, text data and the like.

System control circuit 110 reads and reproduces video data prestored in hard disk 144 included in hard disk drive 140 or DVD 172 mounted to DVD drive 170. Although it is assumed that system control circuit 110 reads and reproduces video data stored in hard disk 144 in the following description, it may read and reproduce video data stored in DVD 172 as well. The recording medium may be any medium besides those described above, as long as it manages reproduction time information and chapter information of video data for each title.

Figure 2:
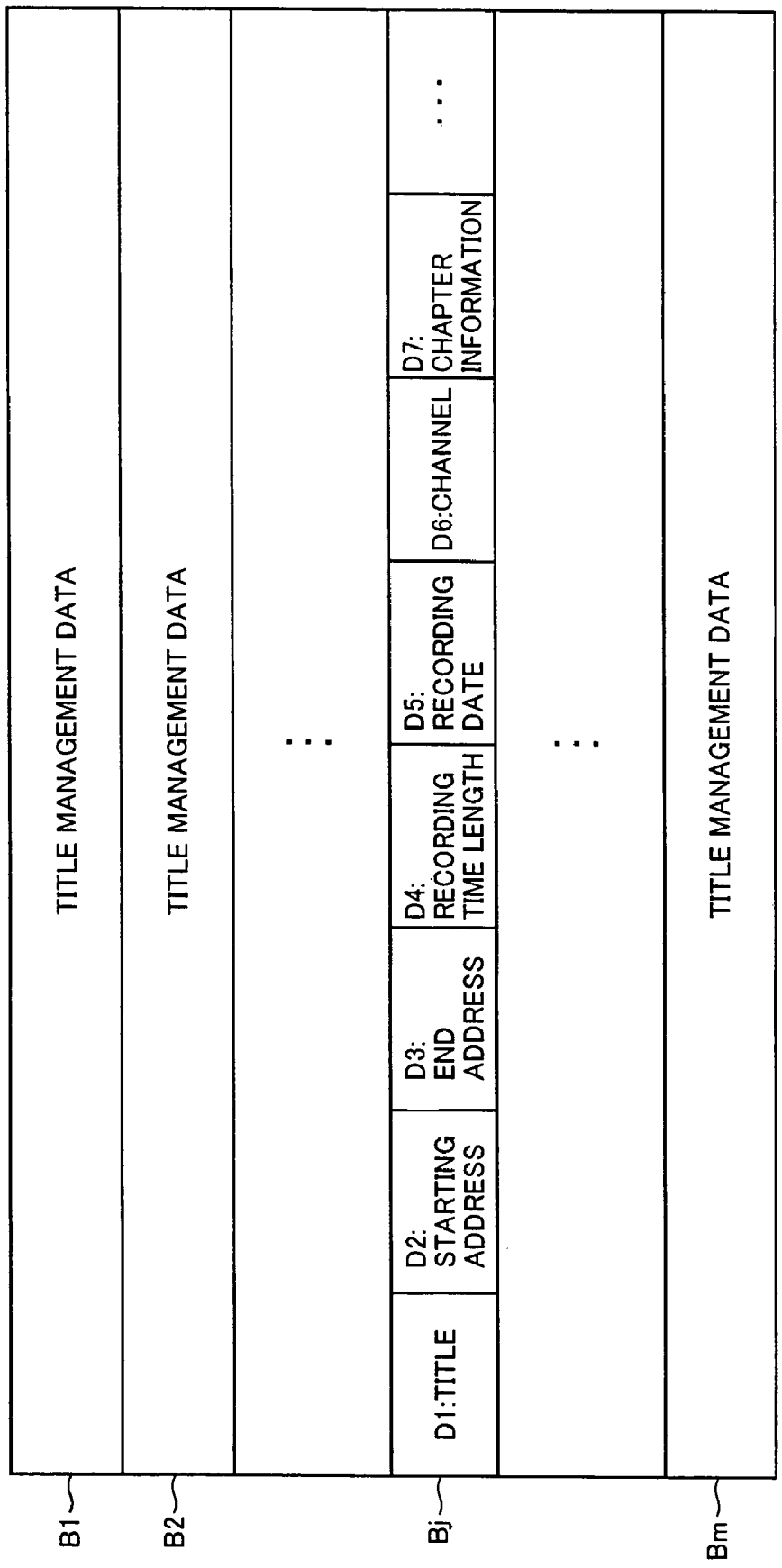
FIG. 2 shows a structure example of a title management table.

FIG. 2 shows a structure example of a title management table of video data recorded on hard disk 144. This title management table is stored, e.g., in a system region of hard disk 144.

Referring to FIG. 2, the title management table has title management data Bj (j=1, 2, 3, . . . , m) for each title. Title management data Bj includes a title name D1, a starting address D2, an end address D3, a recording time length D4 a recording date D5, a channel D6, chapter information D7, and the like. Chapter information D7 stores time information for specifying a position of image data of one frame, for example. Title management data Bj may include only starting address D2, end address D3, recording time length D4, and chapter information D7. Meanwhile, chapter information D7 may store a plurality of pieces of time information.

FIG. 3 shows, by way of example, contents of chapter information D7 of title management data Bj.

Referring to FIG. 3, chapter information D7 stores a chapter number 31 and a reproduction time 32, for example. Reproduction time 32 is stored in association with chapter number 31. Reproduction time 32 is time information indicating the position on the image data where a chapter is marked on one title, which specifically is an elapsed time from start of reproduction of the relevant title.

In FIG. 3, for example, reproduction time 32 corresponding to a chapter having chapter number 31 of "1" is "00:15:15". This means that the position on the image data where the first chapter is marked is the position where 15 minutes and 15 seconds have passed from the start. Reproduction time 32 corresponding to a chapter having chapter number 31 of "2" is "00:45:30". This means that the second chapter is marked on the image data at a position where 45 minutes and 30 seconds have passed from the start. Further, reproduction time 32 corresponding to a chapter having chapter number 31 of "3" is "01:50:55". This means that the position on the image data provided with the third chapter corresponds to the position of one hour, 50 minutes and 55 seconds from the start. As such, chapter information D7 stores time information indicating the positions of a finite number of chapters having the chapter numbers from "1" to "n".

Next, a notification image displayed on a screen in response to an external instruction will be described. The "notification image" is an image for notifying a user of occurrence of a change in state of the apparatus in accordance with a user instruction or a set time. Preferably, the notification image is a stationary image displayed at a corner of the screen for a prescribed period of time (e.g., five seconds). The change in state of the apparatus may include occurrence of an event of recording, recording stop, play, pause, fast-forward, rewind, reproduction stop, and the like. Herein, the notification images are called "splash marks", which may be known images used in conventional reproduction apparatuses.

FIG. 4 shows an example of a table of correspondence of the contents of instructions with the splash marks, which is stored, e.g., in a system region of hard disk 144. As such, a plurality of prescribed splash marks are stored in association with the instruction contents.

Referring to FIG. 4, splash marks 42 are stored in association with instruction contents 41. For example, splash mark 42 corresponding to instruction content 41 of "play" includes one triangle pointing right. Splash mark 42 corresponding to instruction content 41 of "chapter skip" is formed of two triangles pointing right that are continuously arranged in the lateral direction, with a vertical straight line added on the right of the triangles. Similarly, splash mark 42 corresponding to instruction content 41 of "chapter back skip" is formed of two triangles pointing left that are continuously arranged in the lateral direction, with a vertical straight line added on the left of the triangles. The "chapter skip" refers to skipping of a chapter in the forward direction, and represents a concept including both such chapter skip (skipping of a chapter in the forward direction) and chapter back skip (skipping of a chapter in the opposite direction).

Instruction content 41 of "fast-forward play at 2× speed" is represented by two triangles pointing right that are arranged continuously in the lateral direction. Instruction content 41 of "fast-forward play at 16× speed" is represented by four triangles pointing right that are arranged continuously in the lateral direction.

In a conventional video data reproduction apparatus, when the user wants to confirm the current reproduction state during reproduction of a title, he/she needs to perform a special manipulation such as depressing the "screen display key" on a remote controller (not shown). An example of the screen displayed when the user manipulates the screen display key during reproduction is shown in FIG. 14.

Figure 14:
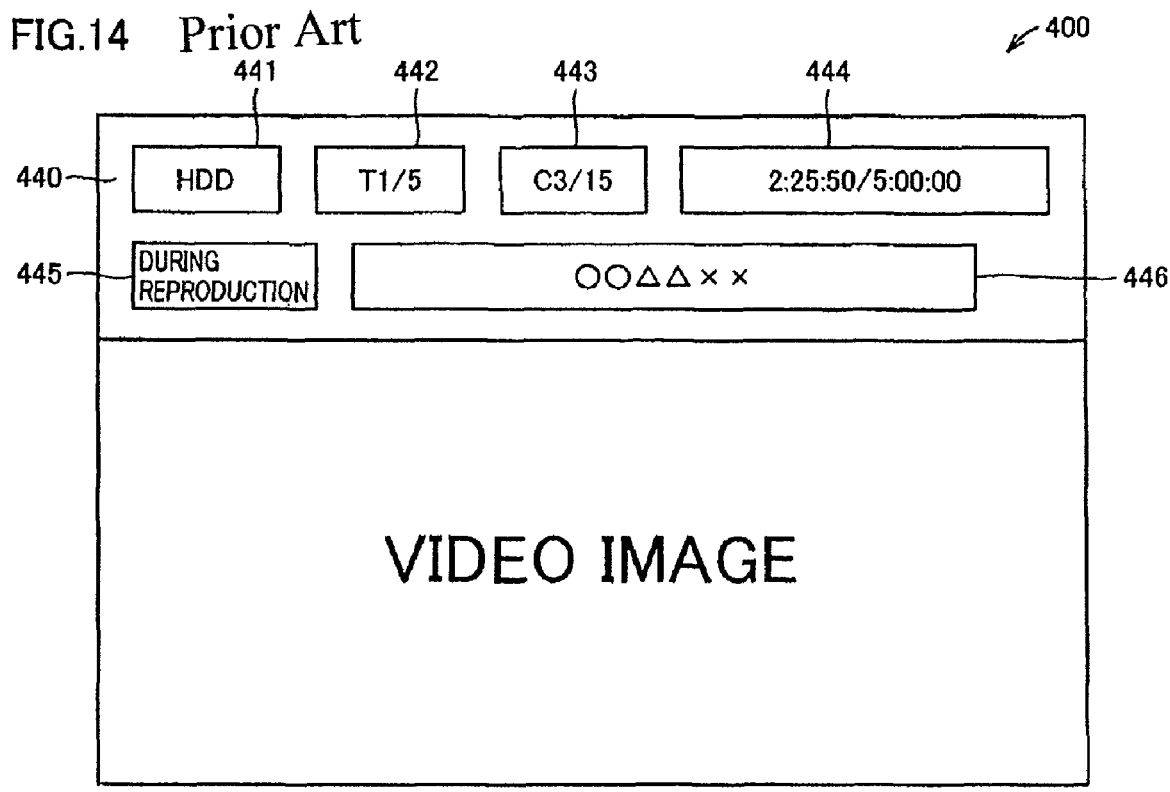
FIG. 14 shows an example of a screen displayed when a user manipulates a screen display key in a conventional video data reproduction apparatus.

FIG. 14 shows by way of example a screen displayed when a user manipulates a screen display key in a conventional video data reproduction apparatus. Referring to FIG. 14, the reproduction state of video data is displayed in an upper region 440 on a television set 400. The "reproduction state of video data" refers to current conditions of the video image being reproduced, which may include, e.g., a mode 441 of DVD or HDD (Hard Disk), the number 442 of the title being reproduced, the number 443 of the chapter being reproduced, a current reproduction time 444, a current status 445, and a name 446 of the title being reproduced. In FIG. 14, for example, "T1/5" is displayed as number 442 of the title being reproduced, indicating that the title now being reproduced is the first title among five titles in total. "C3/15" is displayed as number 443 of the chapter being reproduced, indicating that the chapter now being reproduced is the third chapter among 15 chapters in total.

As such, in a conventional video data reproduction apparatus, a user is required to perform a special manipulation to check the reproduction state of video data.

In view of the foregoing, in DVD recorder 100 according to the embodiment of the present invention, when there is a prescribed instruction during reproduction of a title, specific information is superposed on splash mark 42 for display. The "prescribed instruction" refers to an instruction that triggers display of the above-described splash mark 42, such as instructions of chapter skip, chapter back skip, fast-forward play, reverse play, pause, and the like. In the first embodiment, it is assumed that the "prescribed instruction" corresponds to an instruction of chapter skip, including chapter back skip, for the title being reproduced. The "specific information" refers to information indicating a reproduction state, which is preferably the information in accordance with a (prescribed) instruction from the user. Thus, in the first embodiment, it is assumed that the "specific information" corresponds to information regarding the chapters of the title being reproduced.

Figure 5:
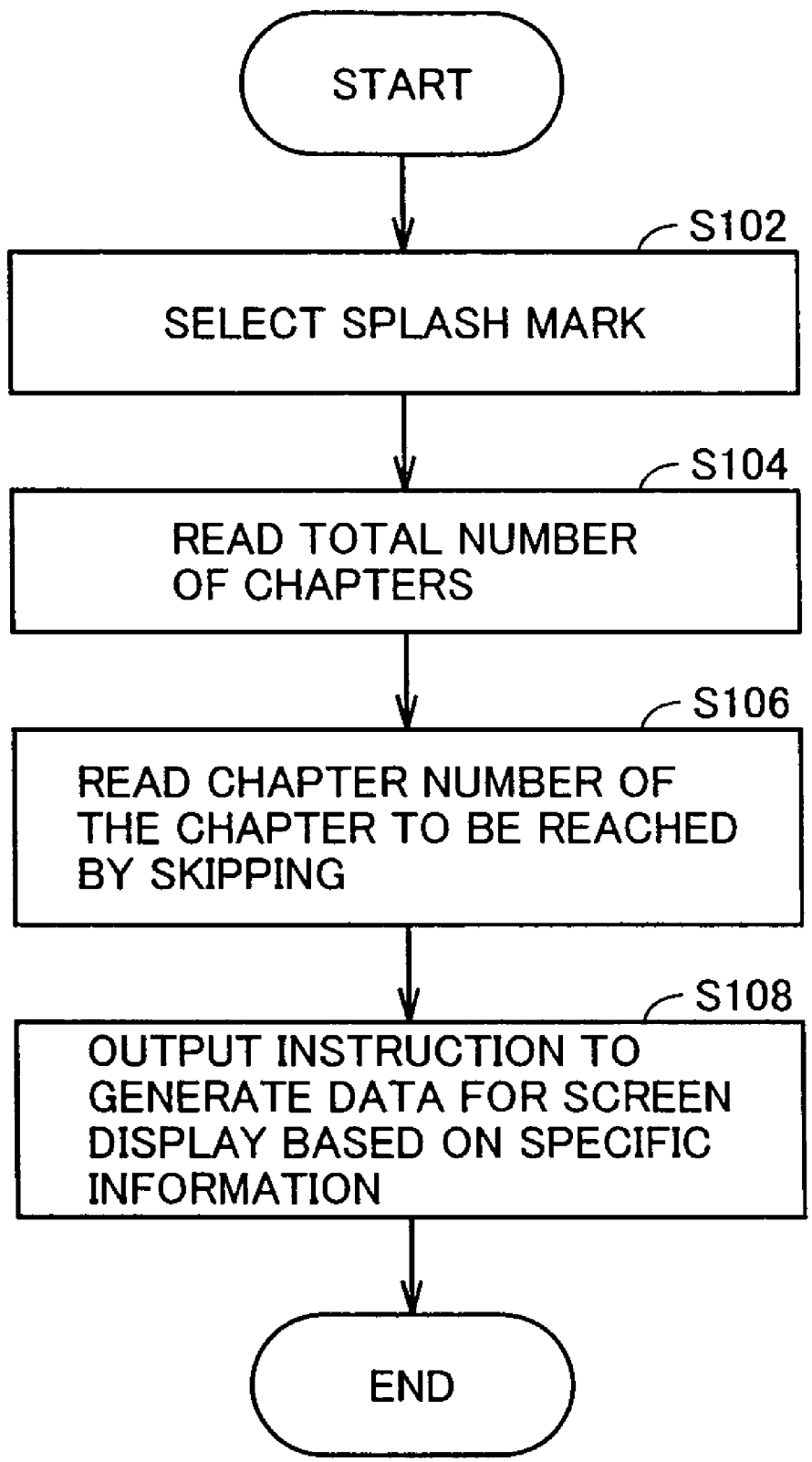
FIG. 5 is a flowchart illustrating a flow of the process carried out by a system control circuit according to a first embodiment of the present invention.

FIG. 5 is a flowchart illustrating a flow of the process that system control circuit 110 carries out in response to the above-described prescribed instruction in the first embodiment of the present invention.

Referring to FIG. 5, when there is a prescribed instruction, i.e., an instruction of either chapter skip or chapter back skip, system control circuit 110 firstly selects splash mark 42 (step S102). As shown in FIG. 4, splash marks 42 are prestored in association with instruction contents 41. Thus, in step S102, splash mark 42 corresponding to the input instruction content 41 is selected.

Next, system control circuit 110 reads a total number of chapters included in the title being reproduced (step S104). System control circuit 110 then reads chapter number 31 of the chapter to be reached by skipping (step S106). Such information about the title being reproduced can be obtained by reading chapter information D7 as shown in FIG. 3.

For example, in step S104, the total number of chapters in the title being reproduced is obtained by reading 'n' corresponding to chapter number 31 of the last chapter. In step S106, chapter number 31 of the chapter to be reached by skipping is obtained by retrieving the reproduction time 32 immediately after or immediately before the reproduction time of the title (video data) at the time when the above-described prescribed instruction was input.

Next, system control circuit 110 outputs an instruction to OSD image generation circuit 114 to generate data for screen display based on the information specified by the processing in steps S102-S106 (S108). Specifically, it provides OSD image generation circuit 114 with splash mark 42 selected in step S102, the information regarding the chapters (i.e., the total number of chapters (n) and chapter number 31) read in steps S104 and S106, as well as information about the location where they are to be displayed.

OSD image generation circuit 114, in receipt of the instruction from system control circuit 110, generates the data for screen display based on a manner predetermined for the screen display. The generated data for screen display is output to combination circuit 158.

Hereinafter, generation of the data for screen display according to the first embodiment will be described.

Splash marks 42 associated with instruction contents 41 of "chapter skip" and "chapter back skip" are each formed of two triangles that are arranged continuously in the lateral direction, as described above. Thus, in the present embodiment, chapter number 31 and the total number of chapters (n) are superposed on one and the other of the two triangles to generate the data for screen display. With this configuration, one number having a single meaning is displayed on each triangle, so that the font of the number can be made large. Further, since the known notification images (splash marks 42) are employed, they would not interfere the video data reproduced subsequently.

As such, the data for screen display has the specific information superposed on splash mark 42, and thus, it is also referred to as "splash data" in the following.

Figure 6A:
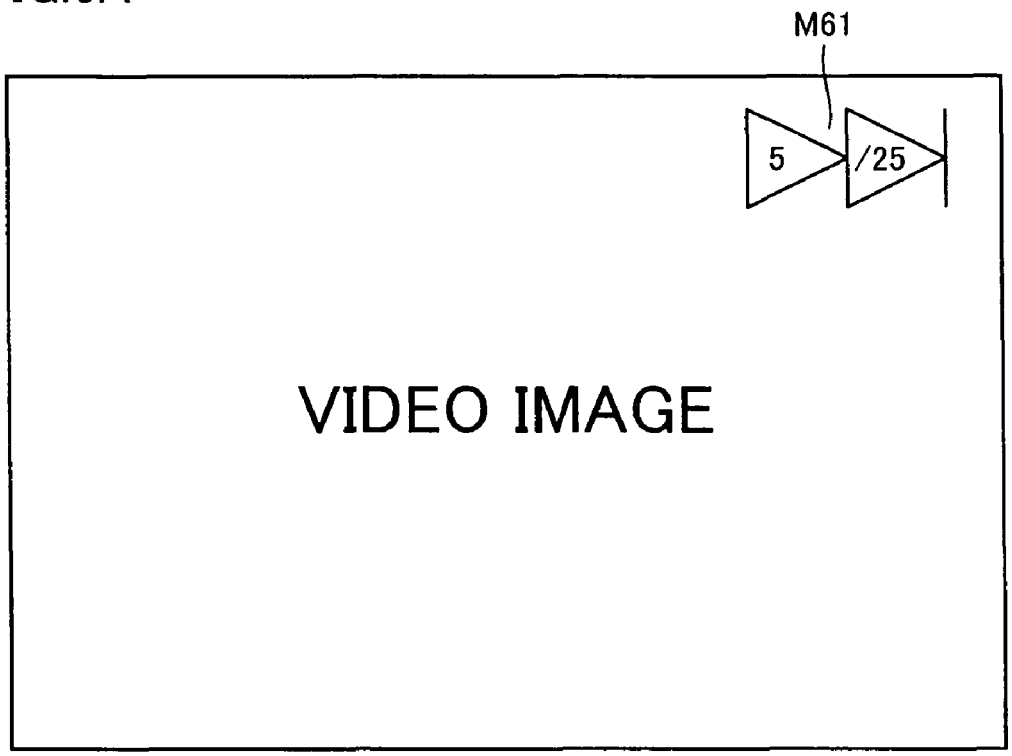
FIG. 6A shows an example of screen display of splash data when an instruction of chapter skip is input in the first embodiment.
Figure 6B:
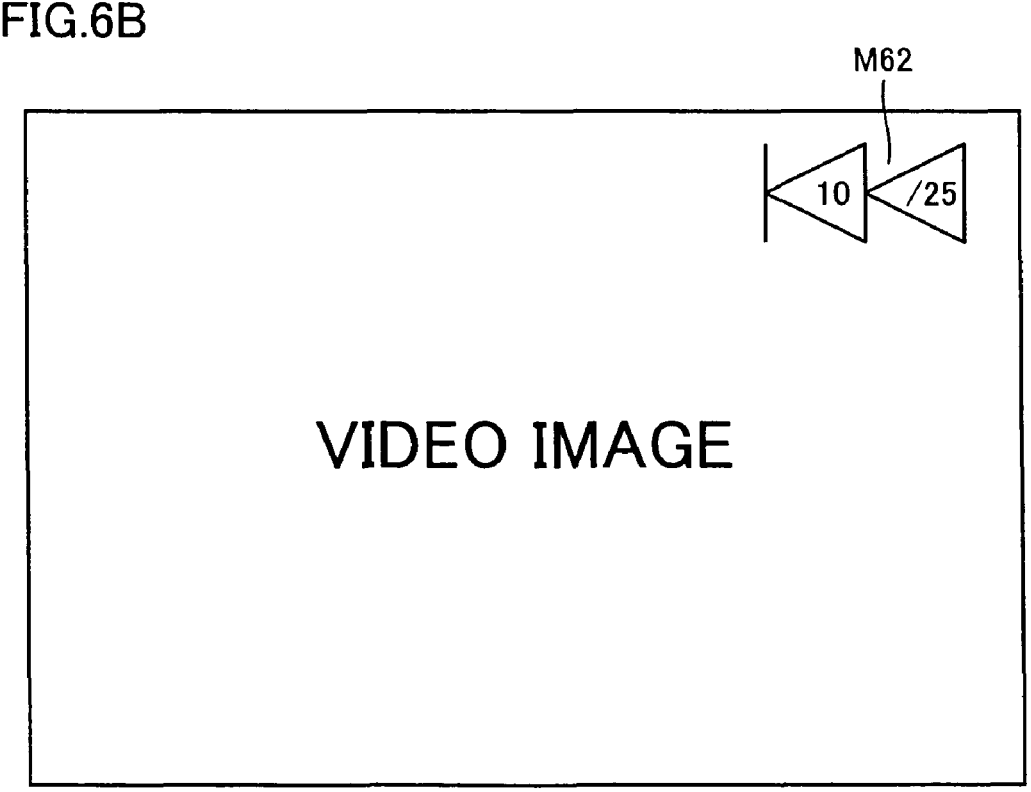
FIG. 6B shows an example of screen display of splash data when an instruction of chapter back skip is input in the first embodiment.

After the series of processing as described above, the splash data is displayed on television set 400 as shown in FIGS. 6A and 6B.

FIGS. 6A and 6B show examples of screen display of splash data according to the first embodiment. Specifically, FIG. 6A shows an example of screen display at the time when an instruction of chapter skip is input. FIG. 6B shows an example of screen display at the time when an instruction of chapter back skip is input.

Referring to FIG. 6A, splash data M61 is displayed in an upper right region on the screen of television set 400. In splash data M61, "5" and "/25" are displayed on the left and right triangles, respectively. This allows the user to understand that the total number of chapters in the title being reproduced is 25 and that chapter number 31 of the chapter to be reached by skipping is 5.

Referring to FIG. 6B, splash data M62 is displayed in the upper right region on the screen of television set 400. In splash data M62, "10" and "/25" are displayed on the left and right triangles, respectively. This allows the user to confirm that the total number of chapters in the title being reproduced is 25 and that chapter number 31 of the chapter to be reached by skipping is 10.

As such, in the present invention, conventional splash marks 42 are utilized to eliminate the need for the user to perform a special manipulation. Further, useful information in association with the content of the instruction from the user can be presented without sacrificing the region on the screen where video data (reproduced title) is displayed.

Although both of the chapter number of the chapter to be reached by skipping and the total number of chapters are included in the splash data in the first embodiment of the present invention, only one of them may be included. For example, when only the chapter number of the chapter to be reached by skipping is included in the splash data for the chapter skip, the figure in ten's place and the figure in one's place of the relevant number may be displayed on the left and right triangles, respectively.

Further, although the information regarding chapters is displayed using the two triangles in the first embodiment, only one triangle may be used for display instead.

Furthermore, the way of displaying the chapter number of the chapter to be reached by skipping and the total number of chapters is not restricted to the use of numerics as described above Symbols or characters may also be used for display.

Still further, both of hard disk drive 140 and DVD drive 170 are provided in the first embodiment of the present invention. Alternatively, only one of them or another disk drive may be provided.

Second Embodiment

In the first embodiment described above, at the time when there is an input of a prescribed instruction, i.e., an instruction of chapter skip, including chapter back skip, of the title being reproduced, information regarding the chapters is superposed on the splash mark indicating the instruction content for display. In the second embodiment, as in the case of the first embodiment, upon receipt of the instruction of chapter skip or chapter back skip for the title being reproduced, information regarding the chapters is superposed on the splash mark indicating the instruction content for display. Thus, in the second embodiment as well, it is assumed that the "prescribed instruction" corresponds to the instruction of chapter skip, including chapter back skip, for the title being reproduced, and that the "specific information" corresponds to the information regarding the chapters of the title being reproduced.

The second embodiment differs from the first embodiment in the following point. In the first embodiment, the information regarding the chapters to be superposed on the splash mark includes the total number of chapters and the chapter number of the chapter to be reached by skipping. In the second embodiment, a skip time is superposed on the splash mark as the information regarding the chapters.

Hereinafter, a video data reproduction apparatus according to the second embodiment of the present invention will be described. The configuration of the video data reproduction apparatus of the second embodiment is similar to that of the first embodiment, and thus, the reference characters the same as those used for DVD Recorder 100 in FIG. 1 are used in the second embodiment, and detailed description thereof will not be repeated.

In the second embodiment, it is assumed that video data stored in hard disk 144 is to be read and reproduced, as in the first embodiment. It is also assumed that the tables shown in FIGS. 2-4 used in the first embodiment are stored in the system region of hard disk 144.

Figure 7:
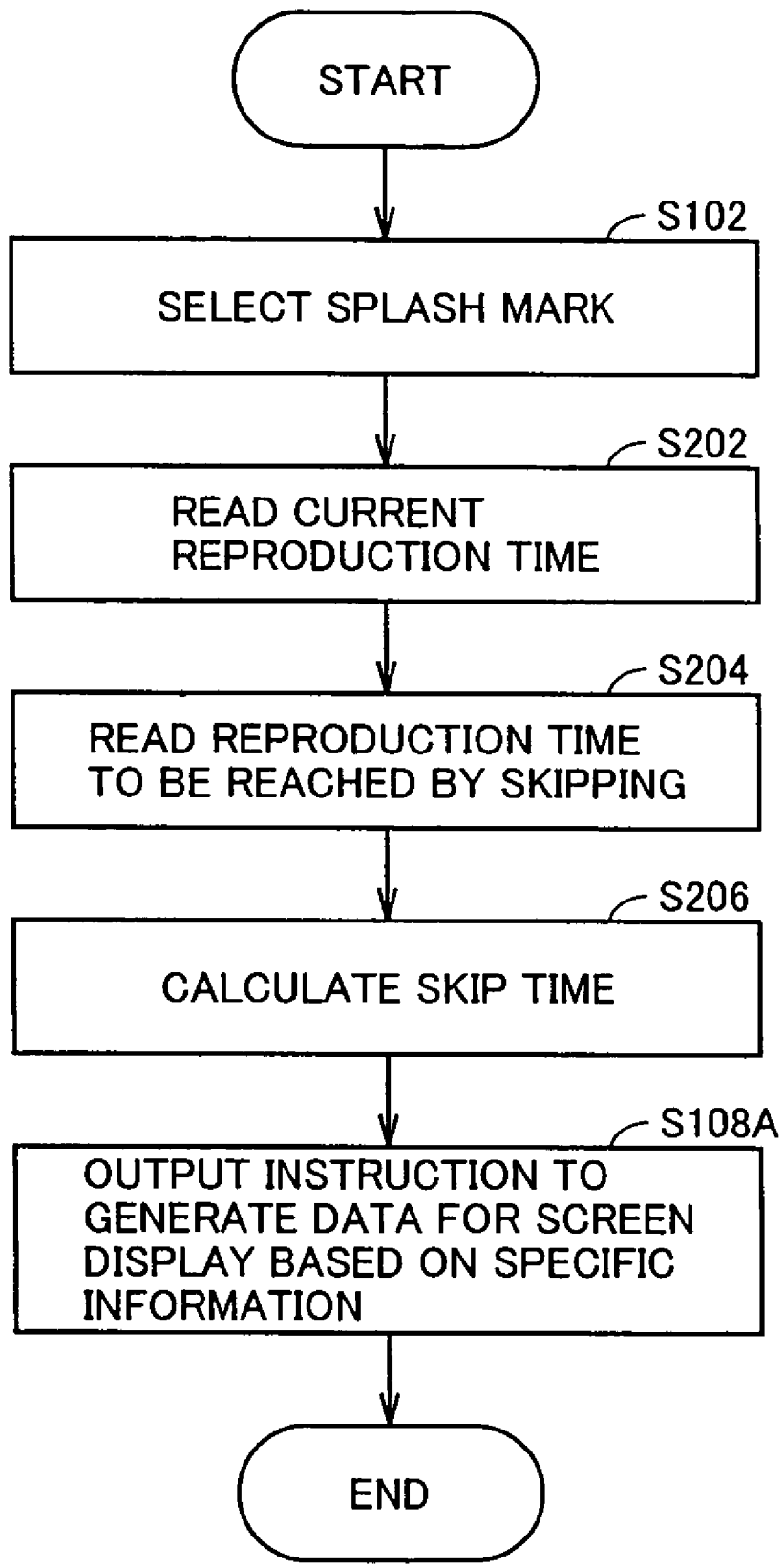
FIG. 7 is a flowchart illustrating a flow of the process carried out by a system control circuit in a second embodiment of the present invention.

FIG. 7 is a flowchart illustrating a flow of the process carried out by system control circuit 110 when the prescribed instruction described above is provided in the second embodiment of the present invention. The process steps identical to those in FIG. 5 have the same step numbers allotted, and detailed description thereof will not be repeated.

Referring to FIG. 7, in step S102, splash mark 42 is selected. System control circuit 110 then reads a current reproduction time of the title being reproduced (step S202). Next, system control circuit 110 reads a reproduction time to be reached by skipping (step S204). This reproduction time to be reached by skipping is obtained, e.g., by retrieving from chapter information D7 shown in FIG. 3 a reproduction time 32 immediately after or immediately before the current reproduction time read in step S202.

Next, system control circuit 110 calculates the skip time (step S206). Specifically, it calculates a difference between the current reproduction time read in step S202 and the reproduction time to be reached by skipping read in step S204.

For example, assume that the current reproduction time read in step S202 is 35 minutes and 30 seconds and that the prescribed instruction indicates chapter skip. In this case, referring to FIG. 3, reproduction time 32 to be reached by skipping is 45 minutes and 30 seconds. Thus, the time difference of 10 minutes is obtained between the current reproduction time (35 minutes and 30 seconds) and reproduction time 32 to be reached by skipping (45 minutes and 30 seconds). If the prescribed instruction indicates chapter back skip, referring to FIG. 3, reproduction time 32 to be reached by skipping is 15 minutes and 15 seconds. Thus, in this case, the time difference of 20 minutes and 15 seconds is obtained between the current reproduction time (35 minutes and 30 seconds) and reproduction time 32 to be reached by skipping (15 minutes and 15 seconds).

In the present embodiment, the calculation in step S206 is carried out such that the skip time is represented in two continuous time units. The "two continuous time units" refer to "hour and minute" or "minute and second". In the present embodiment, the skip time is calculated such that it is represented in "hour and minute", for example, in which case the "seconds" obtained by calculation are truncated or rounded off.

After completion of the processing in step S206, the process proceeds to step S108A.

In step S108A, system control circuit 110 outputs an instruction to OSD image generation circuit 114 to generate data for screen display based on the information specified by the processing in steps S102 and S206. Specifically, it provides OSD image generation circuit 114 with splash mark 42 selected in step S102, the skip time calculated in step S206, and information of the location where they are to be displayed.

OSD image generation circuit 114, in receipt of the instruction from system control circuit 110, generates the data for screen display based on a manner predetermined for display on the screen. The data for screen display thus generated is output to combination circuit 158.

Hereinafter, generation of the data for screen display according to the second embodiment will be described.

In the second embodiment, similarly as in the first embodiment, splash marks 42 associated with instruction contents 41 of "chapter skip" and "chapter back skip" are each formed of two triangles that are arranged continuously in the lateral direction. Thus, in the present embodiment, the larger time unit and the smaller time unit constituting the skip time are superposed on the left and right triangles, respectively, of the two triangles to generate the data for screen display. In the present embodiment, it is configured such that the "hour" and the "minute" of the skip time are superposed on the left and right triangles, respectively. As such, the "larger time unit" refers to "hour" and the "smaller time unit" refers to "minute" when the time is represented by hour and minute.

The skip time may be represented using only seconds. All that is needed is that the skip time is superposed on splash mark 42. Alternatively, it may be configured such that the figures in hundred's and upper places are superposed on the left triangle and the figures in ten's and one's places are superposed on the right triangle.

Figure 8A:
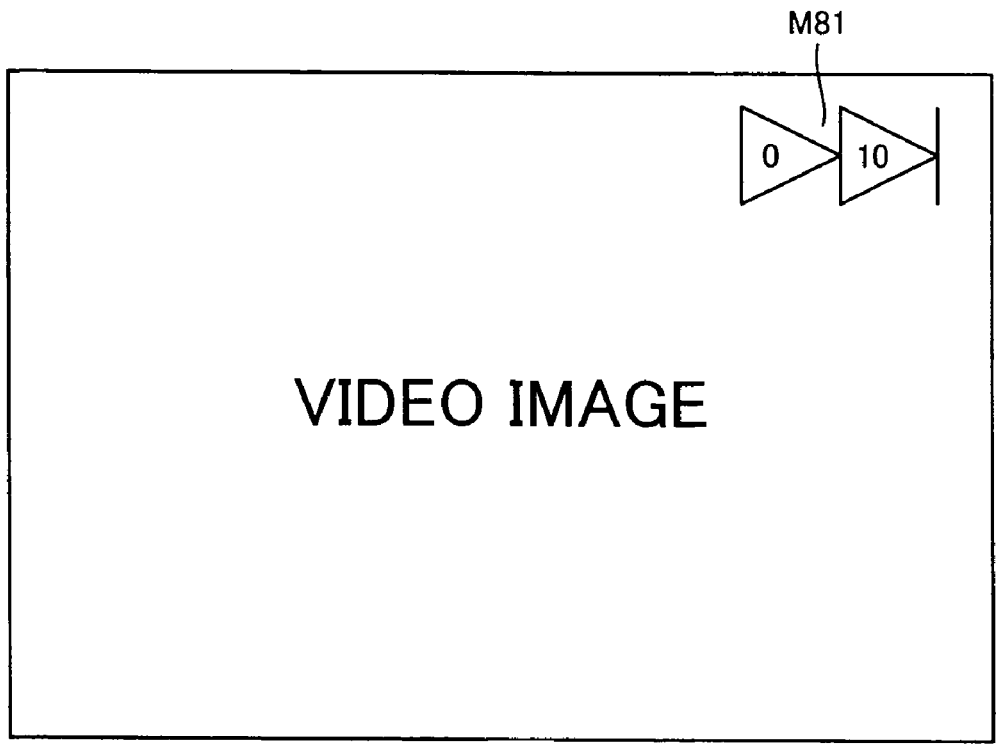
FIG. 8A shows an example of screen display of splash data when an instruction of chapter skip is input in the second embodiment.
Figure 8B:
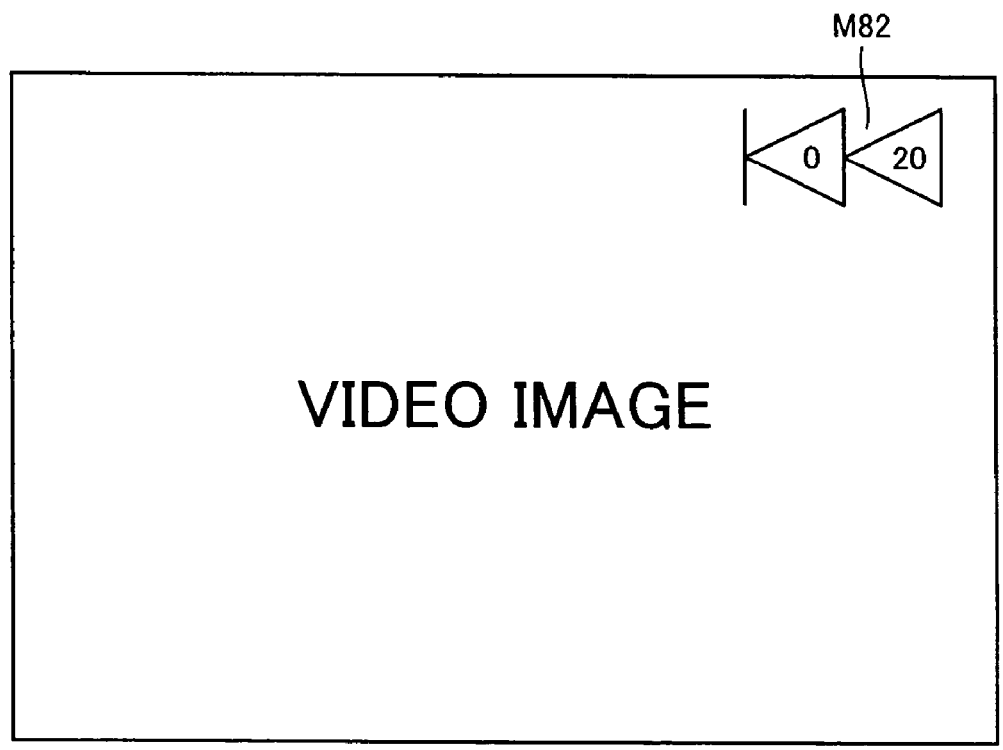
FIG. 8B shows an example of screen display of splash data when an instruction of chapter back skip is input in the second embodiment.

FIGS. 8A and 8B show examples of screen display of splash data according to the second embodiment of the present invention. Specifically, FIG. 8A shows an example of screen display when an instruction of chapter skip is input, and FIG. 8B shows an example of screen display when an instruction of chapter back skip is input.

Referring to FIG. 8A, splash data M81 is displayed, e.g., in an upper right region on the screen of television set 400. In splash data M81, "0" is displayed in the left triangle and "10" is displayed in the right triangle. This notifies the user that the skip time is (0 hour and) 10 minutes, in the similar manner as in the case where "0:10" is displayed.

Referring to FIG. 8, splash data M82 is displayed, e.g., in an upper right region on the screen of television set 400. In splash data M82, "0" and "20" are displayed in the left and right triangles, respectively. This notifies the user that the skip time is (0 hour and) 20 minutes, in the similar manner as in the case where "0:20" is displayed.

As described above, in the second embodiment as well, conventional splash marks 42 can be utilized to eliminate the need for a user to perform a special manipulation. Further, useful information corresponding to the content of the user instruction can be presented without sacrificing the region on the screen where video data (reproduced title) is displayed.

In the second embodiment of the present invention, both of the two triangles are used to display the skip time as the information regarding the chapters. Alternatively, only one of the triangles may be used to display the same.

Further, the way of displaying the skip time is not restricted to the use of numerics as described above. Symbols or characters may also be used for display.

Furthermore, in the second embodiment of the present invention as well, both of hard disk drive 140 and DVD drive 170 are provided. Alternatively, only one of them or another disk drive may be provided.

Third Embodiment

In the first and second embodiments described above, when there is an input of a prescribed instruction, i.e., an instruction of chapter skip, including chapter back skip, for the title being reproduced, information regarding the chapters is superposed on the splash mark indicating the instruction content for display. In the first embodiment, as the information regarding the chapters, the total number of chapters and the chapter number of the chapter to be reached by skipping are superposed. In the second embodiment, the skip time is superposed as the information regarding the chapters.

In the third embodiment, when a prescribed instruction, i.e., an instruction of chapter skip, including chapter back skip, for the title being reproduced, is input, a reproduction time to be reached by skipping is superposed on the splash mark indicating the instruction content and displayed as the information regarding the chapters. As such, in the third embodiment as well, the "specific information" corresponds to the information regarding the chapters included in the title being reproduced.

Hereinafter, a video data reproduction apparatus according to the third embodiment of the present invention will be described. The configuration of the video data reproduction apparatus of the third embodiment is similar to those of the first and second embodiments, and thus, the same reference characters as those used for DVD recorder 100 shown in FIG. 1 are used, and detailed description thereof will not be repeated.

In the third embodiment, as in the first and second embodiments, it is assumed that video data stored in hard disk 144 is to be read and reproduced. It is also assumed that the tables shown in FIGS. 2-4 referred to in the first embodiment are stored in the system region of hard disk 144.

Figure 9:
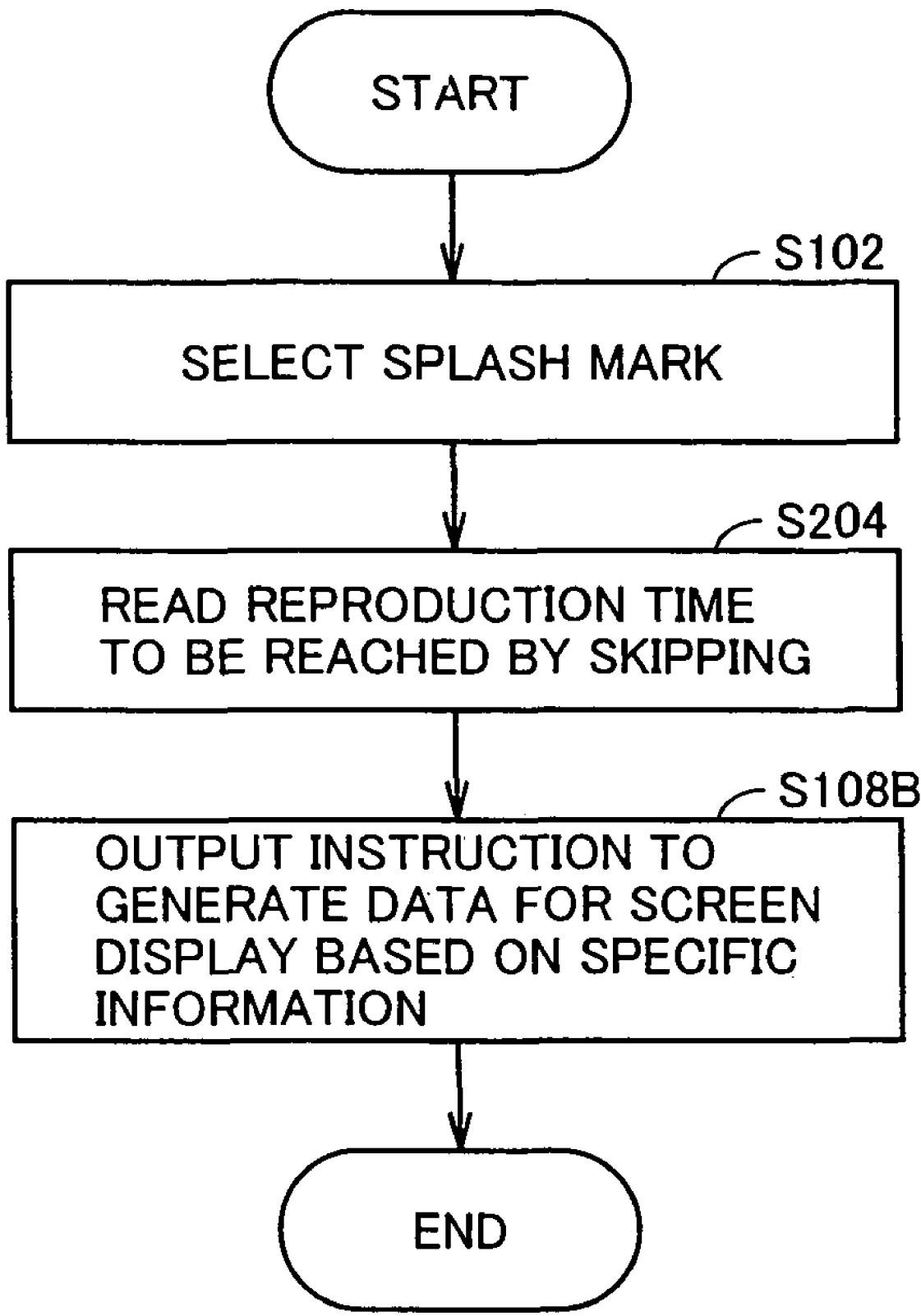
FIG. 9 is a flowchart illustrating a flow of the process carried out by a system control circuit in a third embodiment of the present invention.

FIG. 9 is a flowchart illustrating a flow of the process carried out by system control circuit 110 when there is input of a prescribed instruction described above in the third embodiment of the present invention. The process steps identical to those in FIGS. 5 and 7 have the same step numbers allotted, and detailed description thereof will not be repeated.

Referring to FIG. 9, in step S102, splash mark 42 is selected. In response, system control circuit 110 reads the reproduction time to be reached by skipping (step S204). The reproduction time to be reached by skipping is obtained by retrieving from chapter information D7 shown in FIG. 3 the reproduction time 32 immediately after or immediately before the reproduction time of the title (video data) at the time when the above-described prescribed instruction was input.

After completion of the processing in step S204, the process proceeds to step S108B.

In step S108B, system control circuit 110 outputs an instruction to OSD image generation circuit 114 to generate data for screen display based on the information specified in the processing in steps S102 and S204. Specifically, it provides OSD image generation circuit 114 with splash mark 42 selected in step S102, reproduction time 32 to be reached by skipping read in step S204, and information of the location where they are to be displayed.

OSD image generation circuit 114, in receipt of the instruction from system control circuit 110, generates the data for screen display based on a manner predetermined for display on the screen. The generated data for screen display is output to combination circuit 158.

Hereinafter, generation of the data for screen display according to the third embodiment will be described.

In the third embodiment, similarly as in the first and second embodiments, splash marks 42 associated with instruction contents 41 of "chapter skip" and "chapter back skip" are each formed of two triangles arranged continuously in the lateral direction. Thus, in the present embodiment, the larger time unit and the smaller time unit constituting reproduction time 32 to be reached by skipping are superposed on the left and right triangles, respectively, of the two triangles. In the present embodiment, for example, "hour" and "minute" of reproduction time 32 to be reached by skipping are superposed on the left and right triangles, respectively.

Alternatively, "minute" and "second" may be superposed on the left and right triangles, respectively. All that is needed is that reproduction time 32 to be reached by skipping is superposed on splash mark 42. Further, reproduction time 32 to be reached by skipping may be represented using seconds only. In this case, the figures in hundred's and upper places may be superposed on the left triangle, while the figures in ten's and one's places may be superposed on the right triangle.

Figure 10A:
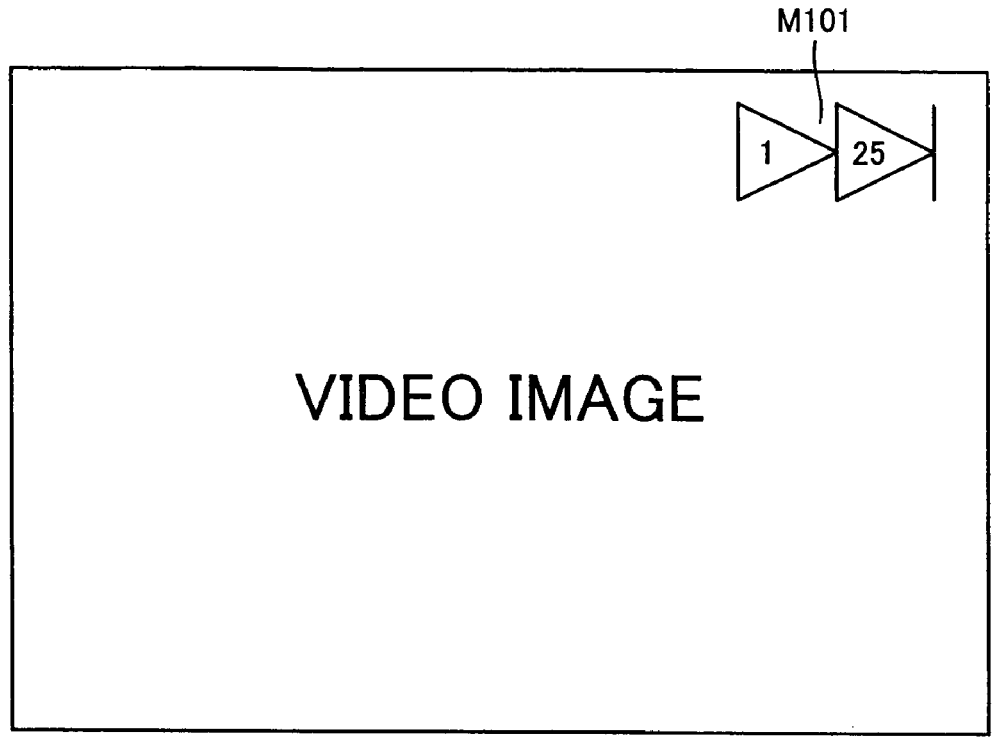
FIG. 10A shows an example of screen display of splash data when an instruction of chapter skip is input in the third embodiment.
Figure 10B:
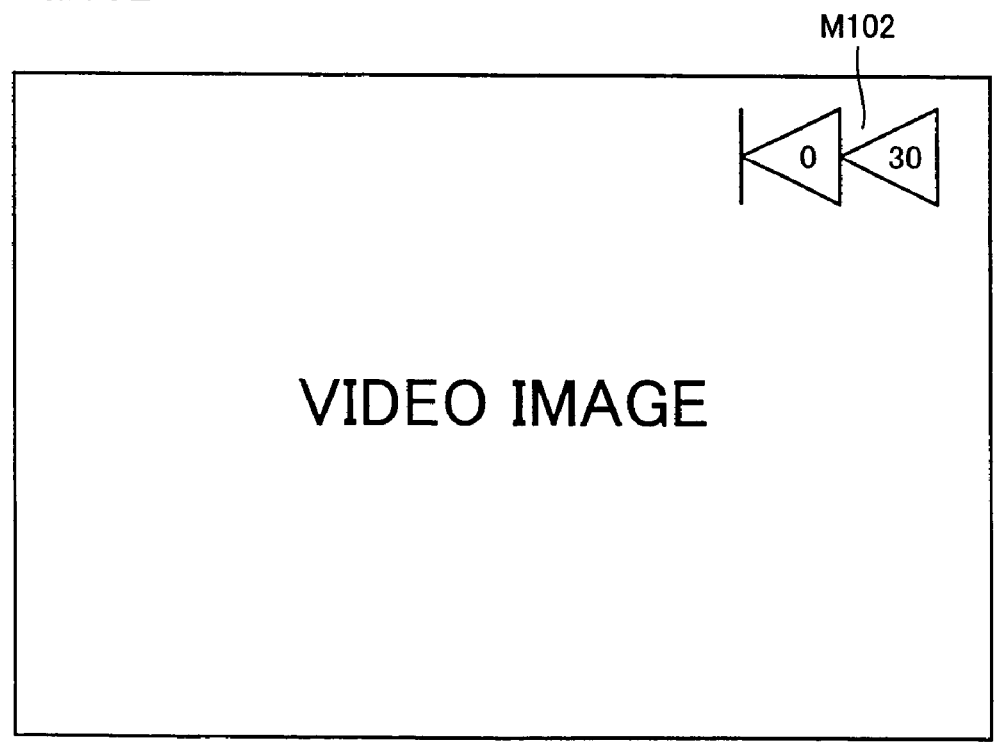
FIG. 10B shows an example of screen display of splash data when an instruction of chapter back skip is input in the third embodiment.

FIGS. 10A and 10B show examples of screen display of the splash data according to the third embodiment. Specifically, FIG. 10A shows an example of screen display in the case where an instruction of chapter skip is input. FIG. 10B shows an example of screen display in the case where an instruction of chapter back skip is input.

Referring to FIG. 10A, splash data M101 is displayed in an upper right region, for example, on the screen of television set 400. In splash data M101, "1" is displayed on the left triangle, and "25" is displayed on the right triangle. This allows the user to confirm that the reproduction time to be reached by skipping is one hour and 25 minutes, in the similar manner as in the case where "1:25" is displayed.

Referring to FIG. 10B, splash data M102 is displayed in the upper right region, for example, on the screen of television set 400. In splash data M102, "0" and "30" are displayed on the left and right triangles, respectively. This notifies the user that the reproduction time to be reached by skipping is (0 hour and) 30 minutes, in the similar manner as in the case where "0:30" is displayed.

As described above, in the third embodiment as well, conventional splash marks 42 are utilized, so that a special manipulation by the user becomes unnecessary. Further, useful information corresponding to the content of the instruction from the user can be presented without sacrificing the region on the screen where video data (reproduced title) is displayed.

In the third embodiment of the present invention, both of the two triangles are used to display the reproduction time to be reached by skipping as the information regarding the chapters. Alternatively, only one of the triangles may be used to display the same.

Further, the way of displaying the reproduction time to be reached by skipping is not restricted to the use of numerics as described above. Symbols or characters may also be used for displaying the same.

Furthermore, in the third embodiment of the present invention as well, hard disk drive 140 and DVD drive 170 are both provided. Alternatively, one of them or another disk drive may be provided.

Fourth Embodiment

In the first through third embodiments described above, when there is an input of an instruction of chapter skip, including chapter back skip, for the title being reproduced, information regarding the chapters is superposed on the splash mark indicating the instruction content for display.

In the fourth embodiment of the present invention, when a prescribed instruction, i.e., an instruction of trick reproduction, is input, position information of the current reproduction time with respect to the total reproduction time of the title being reproduced (video data) is superposed on the splash mark indicating the instruction content for display.

Thus, in the fourth embodiment, the "specific information" corresponds to the position information of the current reproduction time of the title being reproduced.

In the present embodiment, the "trick reproduction" refers to reproduction of any type other than normal play. It may be, e.g., fast-forward play or reverse play where fast-forwarding or rewinding is performed while the video data is being displayed on the screen.

Hereinafter, a video data reproduction apparatus according to the fourth embodiment of the present invention will be described. The configuration of the video data reproduction apparatus of the fourth embodiment is identical to those of the first through third embodiments, and thus, the same reference characters as those used for DVD recorder 100 in FIG. 1 are employed, and detailed description thereof will not be repeated.

In the fourth embodiment, similarly as in the first through third embodiments, it is assumed that video data stored in hard disk 144 is read and reproduced, and that the tables shown in FIGS. 2 and 4 explained in the first embodiment are stored in the system region of hard disk 144. In the fourth embodiment, it is required that title management data Bj in FIG. 2 includes at least starting address D2, end address D3, and recording time length D4.

In a conventional video data reproduction apparatus, if a user wants to know the reproduction state of video data during the title reproduction, the user needs to carry out a special manipulation such as depressing a "screen display key" on the remote controller (not shown), for example. An example of the screen displayed when the screen display key is manipulated by the user is shown in FIG. 14.

The reproduction state of video data may include, not only the information as shown in FIG. 14, but also information about the current position of reproduction with respect to the entire title. The user is required to carry out a special manipulation such as depression of the "screen display key" on the remote controller (not shown) when the user wants to know the current reproduction position. Another example of the screen display when the user manipulates the screen display key is shown in FIG. 15.

Figure 15:
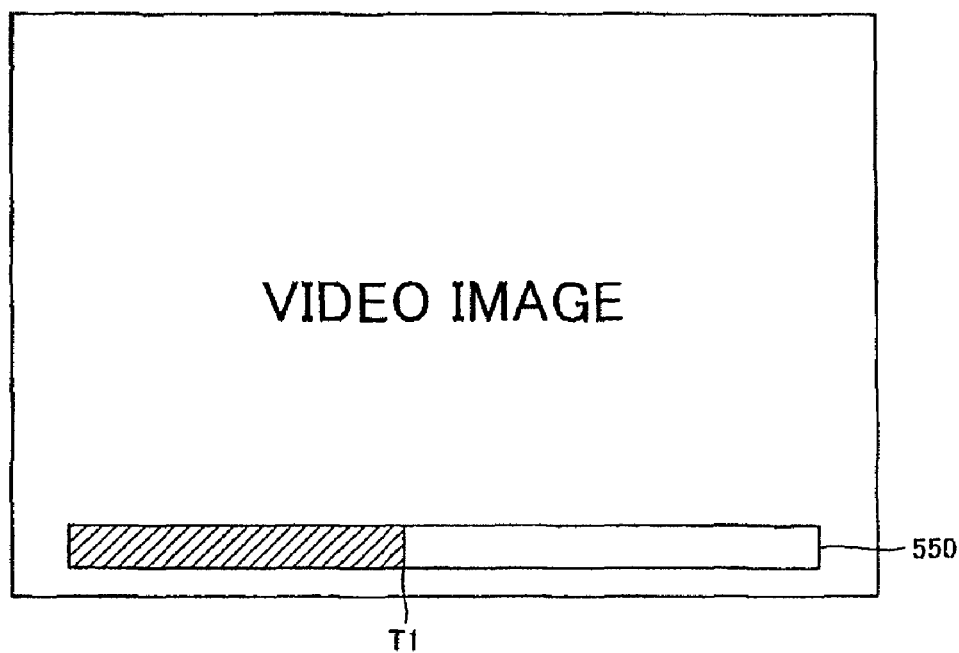
FIG. 15 shows another example of the screen displayed when a user manipulates a screen display key in a conventional video data reproduction apparatus.

FIG. 15 shows another example of the screen that is displayed when the user manipulates the screen display key in a conventional video data reproduction apparatus. Referring to FIG. 15, a time bar 550 of title reproduction is displayed at a bottom section on the screen of television set 400. Time bar 550 has a length that is assumed to correspond to the total reproduction time. On time bar 550, the reproduction state of the video data is displayed with a boundary corresponding to the current reproduction position T1. More specifically, on time bar 550, the region on the left side of reproduction position T1 is lighted to show the current reproduction time.

As such, in a conventional video data reproduction apparatus, the user is required to carry out a special manipulation when he/she wants to know the current reproduction position among the reproduction states of video data.

In the present embodiment, when an instruction of trick reproduction is input, the user is informed of the current reproduction position using a known notification image (splash mark 42).

Figure 11:
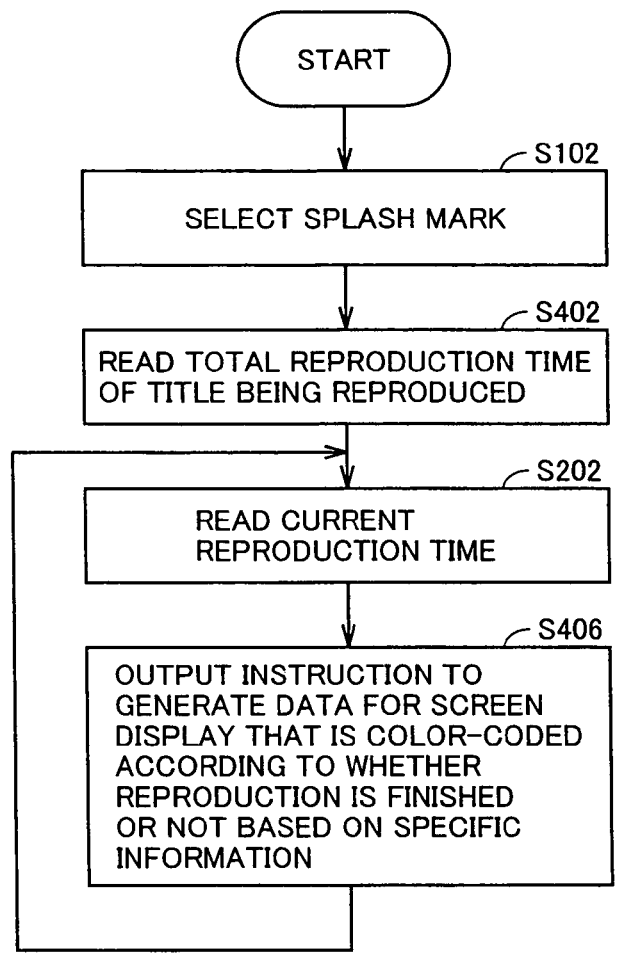
FIG. 11 is a flowchart illustrating a flow of the process carried out by a system control circuit in a fourth embodiment of the present invention.

FIG. 11 is a flowchart illustrating a flow of the process carried out by system control circuit 110 when there is an input of a prescribed instruction of the fourth embodiment, i.e., an instruction of trick reproduction, according to the fourth embodiment of the present invention. The process steps identical to those in FIGS. 5 and 7 have the same step numbers allotted, and detailed description thereof will not be repeated.

Referring to FIG. 11, in step S102, splash mark 42 corresponding to the instruction content of trick reproduction is selected. As shown in FIG. 4, splash marks 42 are prestored in association with instruction contents 41. In step S102, splash mark 42 corresponding to the input instruction content 41 is selected.

Next, system control circuit 110 reads the total reproduction time of the title being reproduced (step S402). The total reproduction time of the title is obtained by reading recording time length D4 in title management data Bj shown in FIG. 2, for example.

Next, system control circuit 110 reads the current reproduction time (S202).

Thereafter, system control circuit 110 outputs an instruction to OSD image generation circuit 114 to generate data for screen display that is color-coded according to whether reproduction has been finished or not, based on the information specified in the processing in steps S102, S402 and S202 (step S406).

OSD image generation circuit 114, in receipt of the instruction from system control circuit 110, generates the data for screen display based on a manner predetermined for display on the screen. The generated data for screen display is output to combination circuit 158.

Hereinafter, generation of the data for screen display according to the fourth embodiment will be described with reference to FIG. 12.

Figure 12:
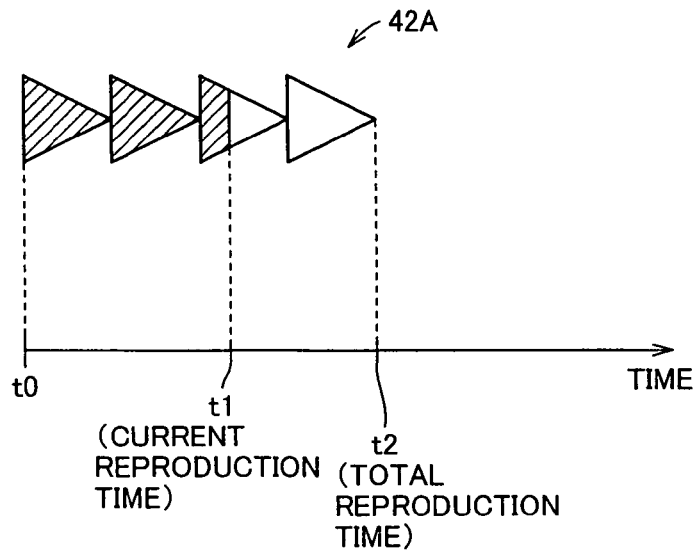
FIG. 12 illustrates generation of data for screen display in the fourth embodiment.

In FIG. 12, splash mark 42 corresponding to "fast-forward play at 16× speed" as the trick reproduction is employed. In FIG. 12, data (splash data) 42A for screen display that is color-coded is shown.

Referring to FIG. 12, in the present embodiment, splash data 42A is regarded as a time base extending from the leftmost end to the rightmost end. More specifically, the length of splash data 42A from its leftmost end (side of the leftmost triangle) to its rightmost end (apex of the rightmost triangle) is considered to correspond to a total reproduction time t2. Splash data 42A is color-coded, bounded by the position of current reproduction time t1 with respect to total reproduction time t2.

For example, splash data 42A may be generated by masking splash mark 42 such that the region on the left side of current reproduction time t1 (i.e., t0 to t1) is lighted to indicate that reproduction thereof has been finished, and the region on the right side of current reproduction time t1 (i.e., t1 to t2) is blinked to indicate that reproduction thereof is not finished yet. Alternatively, splash data of 100 color-coded patterns may be prestored in hard disk 144 or the like. In this case, system control circuit 110 may calculate the percentage of the current reproduction time with respect to the total reproduction time, and select and provide one of the patterns corresponding to the calculated result to OSD image generation circuit 114. The color-coding may be implemented using a known method similar to that used for time bar 550 shown in FIG. 15. Further, although color-coding used herein is based on lighting and blinking, the way of color-coding is not restricted thereto. For example, white and black may be employed instead.

After completion of the processing in step S406, the process returns to step S202. This means that the processing in steps S202 and S406 is repeated until the instruction of trick reproduction is cancelled. In this manner, the data for screen display is generated in OSD image generation circuit 114.

Figure 13A:
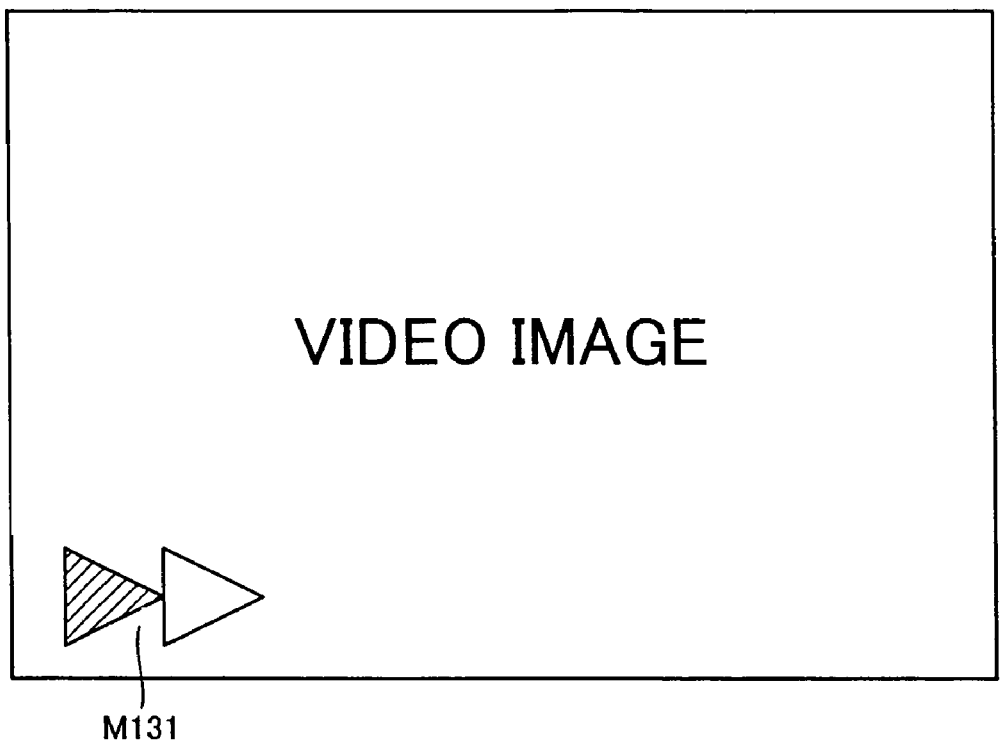
FIG. 13A shows an example of screen display of splash data when an instruction of fast-forward play at 2× speed is input in the fourth embodiment.
Figure 13B:
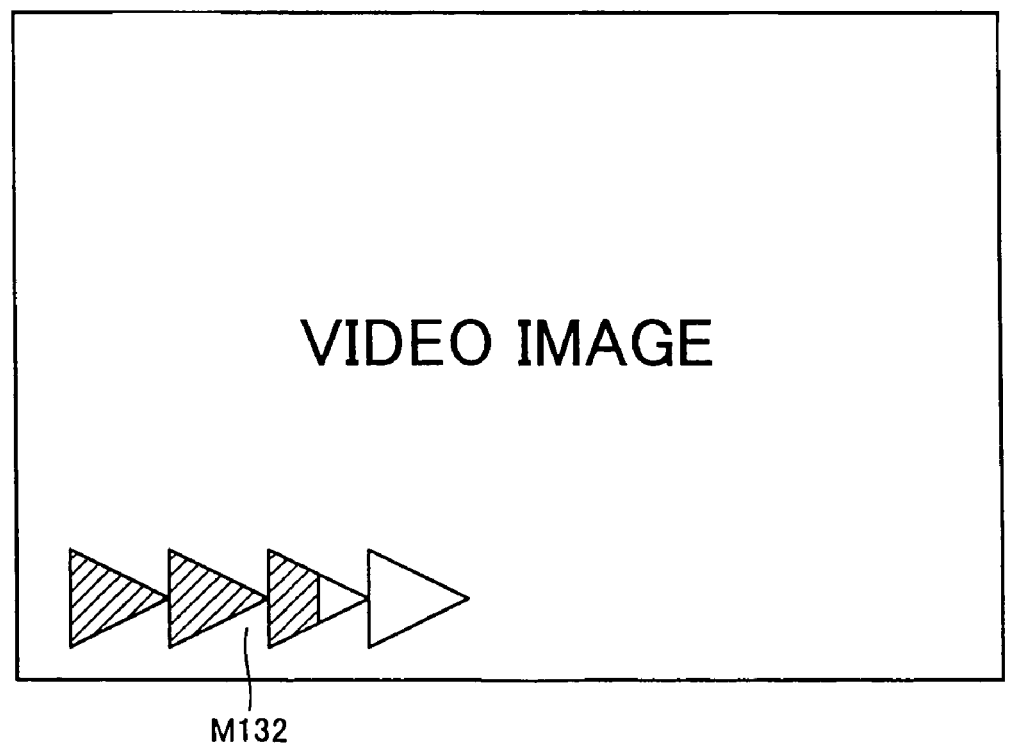
FIG. 13B shows an example of screen display of splash data when an instruction of fast-forward play at 16× speed is input in the fourth embodiment.

FIGS. 13A and 13B show examples of screen display of the splash data according to the fourth embodiment. Specifically, FIG. 13A shows an example of screen display when there is input of an instruction of fast-forward play at 2× speed. FIG. 13B shows an example of screen display when there is input of an instruction of fast-forward play at 16× speed.

Referring to FIG. 13A, splash data M131 is displayed in a lower left region, for example, on the screen of television set 400. Splash data M131 has the same shape as splash mark 42 for fast-forward play at 2× speed, and thus is formed of two triangles pointing right that are arranged continuously. Splash data M131 has the left triangle lighted and the right triangle blinked. This allows the user to understand that the current reproduction position corresponds to approximately half of the total reproduction time.

Referring to FIG. 13B, splash data M132 is displayed in the lower left region, for example, on the screen of television set 400. Splash data M131 has the same shape as splash mark 42 for fast-forward play at 16× speed, and is formed of four triangles pointing right that are arranged continuously. In splash data M132, two triangles from the left and a half of the third triangle are lighted, while the remaining part of the third triangle and the rightmost triangle are blinked. This allows the user to understand that the current reproduction position corresponds to approximately ⅝ of the total reproduction time.

As described above, in the fourth embodiment as well, conventional splash marks 4Z are employed to eliminate the need for a user to perform a special manipulation. Further, useful information corresponding to the content of the instruction from the user can be presented without sacrificing the region on the screen where the video data (reproduced title) is displayed.

In the fourth embodiment, the above-described processing is carried out at the time of trick reproduction. Alternatively, such processing may be carried out at another time such as chapter skip.

Further, in the fourth embodiment of the present invention as well, hard disk drive 140 and DVD drive 170 are both provided. Alternatively, one of them or another disk drive may be provided instead.

In the first through fourth embodiments of the present invention, specific information regarding the reproduction state of video data has been superposed on the splash mark. Alternatively, information regarding another state such as a state of recording, for example, may be superposed on the splash mark.

Furthermore, the video data reproduction apparatus may be configured such that the methods for generating the data for screen display shown in the first through fourth embodiments above may be selected as different modes.

Still further, the splash mark used in the embodiments of the present invention may have a size not the same as that of a commonly used splash mark. For example, it may have a size larger than that of the typical splash mark to facilitate recognition of the specific information.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video data reproduction apparatus, comprising:
   an input portion for receiving instructions from a user;
   a first storage unit for storing video data and management information of said video data;
   a second storage unit for storing a plurality of prescribed notification images in association with said instructions, respectively;
   a controller including a first reading portion for reading said video data stored in said first storage unit in response to said instructions,
   a selecting portion for selecting one of said notification images associated with a prescribed one of said instructions from said second storage unit when said prescribed instruction is input via said input portion while said video data is being output, and
   a second reading portion for referring to said management information to obtain specific information regarding a reproduction state of said video data in association with said prescribed instruction;
   said video data reproduction apparatus further comprising:
   a generating portion for generating data for display by superposing said specific information on said selected notification image;
   a combining portion for combining said data for display generated by said generating portion with said video data read by said first reading portion; and
   an output portion for outputting said data for display combined with said video data,
   wherein
   the selected notification image indicates chapter skip,
   the second reading portion reads a total number of chapters of the video data and a chapter number of the chapter to be reached by the chapter skip from chapter information included in the management information, the generating portion generates the data for display by superposing the total number of chapters and the chapter number on the selected notification image, the selected notification image includes two triangle marks serially connected in a lateral direction, and the generating portion generates the data for display by superposing the chapter number and the total number of chapters on one and the other of the two triangle marks.

2. A video data reproduction apparatus, comprising:

an input portion for receiving instructions from a user;

a first storage unit for storing video data and management information of said video data;

a second storage unit for storing a plurality of prescribed notification images in association with said instructions, respectively;

a controller including a first reading portion for reading said video data stored in said first storage unit in response to said instructions, a selecting portion for selecting one of said notification images associated with a prescribed one of said instructions from said second storage unit when said prescribed instruction is input via said input portion while said video data is being output, and a second reading portion for referring to said management information to obtain specific information regarding a reproduction state of said video data in association with said prescribed instruction;

said video data reproduction apparatus further comprising:

a generating portion for generating data for display by superposing said specific information on said selected notification image;

a combining portion for combining said data for display generated by said generating portion with said video data read by said first reading portion; and an output portion for outputting said data for display combined with said video data, wherein said selected notification image indicates chapter skip, said second reading portion reads, based on a first reproduction time of said video data at the time when said prescribed instruction was input, a second reproduction time to be reached by the chapter skip from said management information, said controller further includes a calculating portion for calculating a skip time based on said first and second reproduction times, said generating portion generates said data for display by superposing said skip time on said selected notification image said selected notification image includes two triangle marks serially connected in a lateral direction, said skip time is a time represented using two continuous time units, and said generating portion generates said data for display by superposing a larger time unit and a smaller time unit of said skip time on a left-side triangle mark and a right-side triangle mark, respectively, of said two triangle marks.

3. A video data reproduction apparatus, comprising:

an input portion for receiving instructions from a user;

a first storage unit for storing video data and management information of said video data;

a second storage unit for storing a plurality of prescribed notification images in association with said instructions, respectively;

a controller including a first reading portion for reading said video data stored in said first storage unit in response to said instructions, a selecting portion for selecting one of said notification images associated with a prescribed one of said instructions from said second storage unit when said prescribed instruction is input via said input portion while said video data is being output, and a second reading portion for referring to said management information to obtain specific information regarding a reproduction state of said video data in association with said prescribed instruction;

said video data reproduction apparatus further comprising:

a generating portion for generating data for display by superposing said specific information on said selected notification image;

a combining portion for combining said data for display generated by said generating portion with said video data read by said first reading portion; and an output portion for outputting said data for display combined with said video data, wherein said selected notification image indicates chapter skip, said second reading portion reads from chapter information included in said management information a reproduction time of said video data to be reached by the chapter skip, said generating portion generates said data for display by superposing said reproduction time on said selected notification image, said selected notification image includes two triangle marks serially connected in a lateral direction, and said generating portion generates said data for display by superposing a larger time unit and a smaller time unit constituting said reproduction time on a left-side triangle mark and a right-side triangle mark, respectively, of said two triangle marks.

4. A video data reproduction apparatus, comprising:

an input portion for receiving instructions from a user;

a first storage unit for storing video data and management information of said video data;

a second storage unit for storing a plurality of prescribed notification images in association with said instructions, respectively;

a controller including a first reading portion for reading said video data stored in said first storage unit in response to said instructions, a selecting portion for selecting one of said notification images associated with a prescribed one of said instructions from said second storage unit when said prescribed instruction is input via said input portion while said video data is being output, and a second reading portion for referring to said management information to obtain specific information regarding a reproduction state of said video data in association with said prescribed instruction;

said video data reproduction apparatus further comprising:

a generating portion for generating data for display by superposing said specific information on said selected notification image;

a combining portion for combining said data for display generated by said generating portion with said video data read by said first reading portion; and an output portion for outputting said data for display combined with said video data, wherein said selected notification image indicates trick reproduction, said second reading portion reads from said management information a total reproduction time of said video data being reproduced,
said generating portion generates said data for display by superposing position information of a current reproduction time with respect to said total reproduction time on said selected notification image, and
said generating portion generates said data for display such that said selected notification image is displayed in different display manners in different portions bounded by a position corresponding to said current reproduction time when a length in a lateral direction of said selected notification image corresponds to said total reproduction time.

* * * * *